(12) United States Patent
Shen et al.

(10) Patent No.: US 11,437,623 B2
(45) Date of Patent: Sep. 6, 2022

(54) SECONDARY BATTERY AND APPARATUS CONTAINED THE SECONDARY BATTERY

(71) Applicant: Contemporary Amperex Technology Co., Limited, Ningde (CN)

(72) Inventors: Rui Shen, Ningde (CN); Jianjun Ma, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/542,533

(22) Filed: Dec. 6, 2021

(65) Prior Publication Data

US 2022/0093925 A1 Mar. 24, 2022

Related U.S. Application Data

(63) Continuation of application No. PCT/CN2020/081691, filed on Mar. 27, 2020.

(51) Int. Cl.
*H01M 4/587* (2010.01)
*H01M 4/505* (2010.01)
(Continued)

(52) U.S. Cl.
CPC ......... *H01M 4/587* (2013.01); *H01M 4/505* (2013.01); *H01M 4/525* (2013.01);
(Continued)

(58) Field of Classification Search
CPC ...... H01M 4/587; H01M 4/505; H01M 4/525; H01M 4/5825; H01M 10/0525;
(Continued)

(56) References Cited

U.S. PATENT DOCUMENTS

| | | | |
|---|---|---|---|
| 5,554,462 | A | 9/1996 | Saft |
| 2004/0023115 | A1 | 2/2004 | Kato et al. |

(Continued)

FOREIGN PATENT DOCUMENTS

| | | |
|---|---|---|
| CN | 104969400 A | 10/2015 |
| CN | 1088079474 A | 11/2018 |

(Continued)

OTHER PUBLICATIONS

The International search report for PCT Application No. PCT/CN2020/081691, dated Nov. 20, 2020, 15 pages.

(Continued)

*Primary Examiner* — Cynthia K Walls
(74) *Attorney, Agent, or Firm* — Law Offices of Liaoteng Wang (57) ABSTRACT

This application discloses a secondary battery and an apparatus containing the secondary batteries. The secondary battery includes a positive electrode plate and a negative electrode plate, the positive electrode plate comprising a positive electrode current collector and a positive electrode film comprising a positive active material; the negative electrode plate comprising a negative electrode current collector and a negative electrode film comprising a negative electrode active material, wherein the positive active material comprises one or more of layered lithium transition metal oxides and modified compounds thereof, the negative electrode active material comprises artificial graphite and natural graphite, and the negative electrode plate satisfies $0.02 \leq I_{3R(012)}/I_{2H(100)} \leq 0.18$, alternatively the positive active material comprises one or more of lithium-containing phosphates with olivine structure and modified compounds thereof, the negative electrode active material includes artificial graphite and natural graphite, and the negative electrode plate satisfies $0.04 \leq I_{3R(012)}/I_{2H(100)} \leq 0.22$.

20 Claims, 2 Drawing Sheets

(51) Int. Cl.
*H01M 4/525* (2010.01)
*H01M 4/58* (2010.01)
*H01M 10/0525* (2010.01)
*H01M 4/02* (2006.01)

(52) U.S. Cl.
CPC ..... *H01M 4/5825* (2013.01); *H01M 10/0525* (2013.01); *H01M 2004/021* (2013.01); *H01M 2004/027* (2013.01); *H01M 2004/028* (2013.01); *H01M 2220/20* (2013.01)

(58) Field of Classification Search
CPC ..... H01M 2004/021; H01M 2004/027; H01M 2004/028; H01M 2220/20
See application file for complete search history.

(56) References Cited

U.S. PATENT DOCUMENTS

| | | | |
|---|---|---|---|
| 2006/0292447 A1 | 12/2006 | Suzuki et al. | |
| 2017/0062822 A1* | 3/2017 | Hwang | H01M 4/587 |
| 2020/0251736 A1* | 8/2020 | Song | H01M 10/0525 |

FOREIGN PATENT DOCUMENTS

| | | |
|---|---|---|
| EP | 2413403 A1 | 2/2012 |
| JP | 1992034491 A | 2/1992 |
| JP | 1996507408 A | 8/1996 |
| JP | 1996287910 A | 11/1996 |
| JP | 1999217266 A | 8/1999 |
| JP | 2005050822 A | 2/2005 |
| JP | 2016505207 A | 2/2016 |
| WO | WO2015147012 A1 | 10/2015 |
| WO | 2019088503 A1 | 5/2019 |

OTHER PUBLICATIONS

The Extended European Search Report for European Application No. 20927265.7, dated Jun. 15, 2022, 11 pages.
"A Basic Guide to Particle Characterization",Malvern Instruments Worldwide-White Paper,May 2, 2012 (May 2, 2012), pp. 1-26,XP055089322.
The First Office Action for Japanese Application No. 2021-554747, dated Jun. 29. 2022, 7 pages.
The First Office Action for Chinese Application No. 202080005610. 4, dated Jul. 21, 2022, 9 pages

* cited by examiner

SECONDARY BATTERY AND APPARATUS CONTAINED THE SECONDARY BATTERY

CROSS-REFERENCE TO RELATED APPLICATION

This application is a continuation of International Application No. PCT/CN2020/081691, filed on Mar. 27, 2020, which is incorporated herein by reference in its entirety.

TECHNICAL FIELD

This application belongs to the technical field of energy storage apparatus, and specifically relates to a secondary battery and an apparatus containing the secondary battery.

BACKGROUND

Secondary batteries are wildly used in various types of electronic products and electric apparatus due to their outstanding features such as high energy density, high working voltage, no pollution and no memory effect. For example, with increasing attention to environmental protection issue, and the increasing popularity of new energy vehicles, the demand for power type secondary battery has shown explosive growth.

As the application of secondary batteries becomes more and more widespread, users have put forward higher demand for secondary battery. Therefore, it is an important aspect in the research and development of a secondary battery at present that how to enable the secondary battery to have high energy density and other electrochemical performances at the same time.

SUMMARY

A first aspect of this application provides a secondary battery, comprising a positive electrode plate and a negative electrode plate, the positive electrode plate comprising a positive electrode current collector and a positive electrode film disposed on at least one surface of the positive electrode current collector and comprising a positive active material; the negative electrode plate comprising a negative electrode current collector and a negative electrode film disposed on at least one surface of the negative electrode current collector and comprising a negative electrode active material;

wherein the positive active material comprises one or more of layered lithium transition metal oxides and modified compounds thereof;

the negative electrode active material comprises artificial graphite and natural graphite, and the negative electrode plate satisfies $0.02 \le I_{3R(012)}/I_{2H(100)} \le 0.18$, preferably $0.04 \le I_{3R(012)}/I_{2H(100)} \le 0.12$, in which the $I_{3R(012)}$ is a peak intensity of an X-ray diffraction peak of a 3R-phase 012 crystal plane of the negative electrode active material in the negative electrode plate, and the $I_{2H(100)}$ is a peak intensity of an X-ray diffraction peak of a 2H-phase 100 crystal plane of the negative electrode active material in the negative electrode plate.

A second aspect of this application provides a secondary battery, comprising a positive electrode plate and a negative electrode plate, the positive electrode plate comprising a positive electrode current collector and a positive electrode film disposed on at least one surface of the positive electrode current collector and comprising a positive active material; the negative electrode plate comprising a negative electrode current collector and a negative electrode film disposed on at least one surface of the negative electrode current collector and comprising a negative electrode active material, wherein the positive active material comprises one or more of lithium-containing phosphates with olivine structure and modified compounds thereof, the negative electrode active material comprises artificial graphite and natural graphite, and the negative electrode plate satisfies $0.04 \le I_{3R(012)}/I_{2H(100)} \le 0.22$, preferably $0.06 \le I_{3R(012)}/I_{2H(100)} \le 0.18$, in which the $I_{3R(012)}$ is a peak intensity of an X-ray diffraction peak of a 3R-phase 012 crystal plane of the negative electrode active material in the negative electrode plate, and the $I_{2H(100)}$ is a peak intensity of an X-ray diffraction peak of a 2H-phase 100 crystal plane of the negative electrode active material in the negative electrode plate.

A third aspect of this application provides an apparatus which includes a secondary battery based on the first and/or second aspects of this application.

This application has at least the following beneficial effects with respect to existing technology:

The secondary battery provided in this application, when the positive electrode plate comprises a certain type of positive active material, the negative active material of the negative electrode plate includes both artificial graphite and natural graphite, and $I_{3R(012)}/I_{2H(100)}$ of the described negative electrode plate is controlled in a certain range, the active ions transmission performance of the negative plate can be improved, so that the secondary battery can obtain better charging performance with higher energy density, and even better low-temperature charging performance. More preferably, the negative electrode plate also has higher surface stability, so that the secondary battery has a higher high-temperature cycle life. The apparatus in this application includes the secondary battery provided in this application and thus has the same advantages as the secondary battery at least.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Secondary Battery

A first aspect of this application provides a secondary battery. The secondary battery comprises a positive electrode plate, a negative electrode plate and an electrolyte. During the charging and discharging process of batteries, active ions intercalate and deintercalate between the positive electrode plate and the negative electrode plate. The electrolyte serves as conducting ions between the positive electrode plate and the negative electrode plate.

[Positive Electrode Plate]

A positive electrode plate may include a positive electrode current collector and a positive electrode film disposed on at least one surface of the positive electrode current collector. As an example, the positive electrode current collector has two opposite surfaces in the direction of its thickness, and the positive electrode film is laminated on either or both of the two surfaces of the positive electrode current collector.

The positive electrode current collector can adopt materials with good conductivity and mechanical strength, serving as conducting electricity and collecting the current. In some embodiments, the negative electrode current collector may adopt an aluminum foil.

The positive electrode film comprises a positive active material. The positive active material can adopt positive active materials known for secondary battery in the art. In some embodiments, the positive active material may include one or more of layered lithium transition metal oxides and modified compounds thereof, and lithium containing phosphates with olivine structure and modified compounds thereof.

In this application, the "modified" in the "modified compounds" means that the material is modified by doping and/or surface coating.

In some embodiments, the positive active material include one or more of layered lithium transition metal oxides and modified compounds thereof. As a specific embodiment, the layered lithium transition metal oxides may include, but are not limited to, one or more of the lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and their modified compounds. Preferably, the layered lithium transition metal oxides include one or more of lithium nickel cobalt manganese oxide, lithium nickel cobalt aluminum oxides and their modified compounds.

In some preferred embodiments, the positive active material include $Li_aNi_bCO_cM_dM'_eO_fA_g$ and modified $Li_aNi_bCO_cM_dM'_eO_fA_g$ with a coating layer on at least part of its surface, wherein $0.8 \le a \le 1.2$, $0.5 \le b < 1$, $0 < c < 1$, $0 < d < 1$, $0 \le e \le 0.1$, $1 \le f \le 2, 0 \le g \le 1$, M is one or more selected from Mn and Al; M' is one or more selected from Zr, Al, Zn, Cu, Cr, Mg, Fe, V, Ti and B; A is one or more selected from N, F, S and Cl.

In some embodiments, M is selected from Mn, and M' is one or more selected from Zr, Al, Zn, Cu, Cr, Mg, Fe, V, Ti and B, preferably comprise one or more of Zr, Al, Zn and B. Alternatively, M is selected from Al, and M' is one or more selected from Zr, Zn, Cu, Cr, Mg, Fe, V, Ti, and B, preferably comprises one or more of the Zr, Zn and B.

The positive active material includes a high nickel ternary positive active material, and thus can have higher gram capacity, thereby increasing the energy density of batteries.

In some preferred embodiments, the coating layer can be found on 80% to 100% of the surface of $Li_aNi_bCO_cM_dM'_eO_fA_g$. Further, the coating layer can be found on 90%~100% of the surface of $Li_aNi_bCO_cM_dM'_eO_fA_g$.

In other embodiments, the positive active material include lithium containing phosphates with olivine structure and modified compound thereof. As a specified embodiment, the lithium containing phosphates with olivine structure may include, but not be limited to one or more of lithium iron phosphate, a composite of lithium iron phosphate with carbon, lithium manganese phosphate, a composite of lithium manganese phosphate with carbon and modified compounds thereof. Preferably, the lithium-containing phosphates with olivine structure include one or more of lithium iron phosphate, a composites of lithium iron phosphate with carbon and modified compounds thereof.

The composite of lithium iron phosphate with carbon can be one or more of a coated composite and an embedded composite. The coated composite means that at least part of the surface of lithium iron phosphate particles has a carbon coating layer. For example, the carbon coating layer is coated on 80% to 100% (such as from 90% to 100%) of the surface of lithium iron phosphate particles. The carbon coating layer may include one or more of graphite, hard carbon, soft carbon, carbon black, coke, and the like. The embedded composite means that lithium iron phosphate is dispersed in a carbon carrier. The carbon carrier may include one or more of graphite, hard carbon, soft carbon, carbon black, coke, and the like.

The composite of lithium manganese phosphate with carbon can be one or more of a coated composite and an embedded composite. The coated composite means that at least part of the surface of lithium manganese phosphate particles has a carbon coating layer. For example, the carbon coating layer is coated on 80% to 100% (such as from 90% to 100%) of the surface of lithium manganese phosphate particles. The carbon coating layer may include one or more of graphite, hard carbon, soft carbon, carbon black, coke, and the like. The embedded composite means that lithium manganese phosphate is dispersed in a carbon carrier. The carbon carrier may include one or more of graphite, hard carbon, soft carbon, carbon black, coke, and the like.

In some embodiments, the positive electrode film may also include an optional binder. The type of binder is not specifically limited, and may be chosen by those skilled in the art according to the actual needs. As an example, the binder for positive electrode film may include one or more of the polyvinylidene fluoride (PVDF) and polytetrafluoroethylene (PTFL).

In some embodiments, the positive electrode film may also include an optional conductive agent. The type of the conductive agent is not specifically limited, and may be chosen by those skilled in the art according to the actual needs. As an example, the conductive agent used for the positive electrode film may include one or more of graphite, superconducting carbon, acetylene black, carbon black, Ketjen black, carbon dots, carbon nanotubes, graphene, and carbon nanofibers.

[Negative Electrode Plate]

The negative electrode plate comprises a negative electrode current collector and a negative electrode film disposed on at least one surface of the negative electrode current collector. For example, the negative electrode current collector has two opposite surfaces in the direction of its thickness, and the negative electrode film is laminated on either or both of the two surfaces of the negative electrode current collector.

The negative electrode current collector can adopt materials with a good conductivity and mechanical strength, serving as conducting electricity and collecting current. In some embodiments, the negative electrode current collector may adopt a copper foil.

The negative electrode film comprises a negative active material. It is found surprisingly that when the negative active material includes both artificial graphite and natural graphite and $I_{3R(012)}/I_{2H(100)}$ of the negative electrode plate is controlled in a certain range, the negative electrode plate can have a higher energy density while improving active ions transmission performance of the negative electrode plate, so that the secondary battery adopting it can obtain increased charging performance, even increased low-temperature charging performance while having a higher energy density. More preferably, the negative electrode plate also has a higher surface stability, so that the secondary battery further has a better high-temperature cycle life.

The $I_{3R(012)}$ is a peak intensity of an X-ray diffraction peak of a 3R-phase 012 crystal plane of the negative electrode active material in the negative electrode plate, and the $I_{2H(100)}$ is a peak intensity of an X-ray diffraction peak of a 2H-phase 100 crystal plane of the negative electrode active material in the negative electrode plate. $I_{3R(012)}$ and $I_{2H(100)}$ can be obtained from an X-ray diffraction pattern test.

Further study by inventors indicates that, when the positive active material of the positive electrode plate includes layered lithium transition metal oxides and/or modified compounds thereof, the negative electrode plate satisfies $0.02 \leq I_{3R(012)}/I_{2H(100)} \leq 0.18$.

The positive active material includes one or more of layered lithium transition metal oxides and modified compounds thereof, which can allow the positive electrode plate have a higher areal density and a compacted density, thereby enabling the battery to have higher energy density. In order to match reversible capacity of the negative electrode plate with reversible capacity of the positive electrode plate, the areal density and compacted density of the negative electrode plate are also higher accordingly. At this time, the negative active material of the negative electrode plate include artificial graphite and natural graphite both, and the negative electrode plate satisfies $0.02 \leq I_{3R(012)}/I_{2H(100)} \leq 0.18$, allowing that the negative electrode plate have more active ion transmission sites, the dynamic performance of intercalated and deintercalated active ions in the negative electrode plate is apparently improved and even in a low temperature environment, these ions also can have a higher active ion diffusion rate so that the active ions from positive electrode may be accepted quickly, thereby improving low-temperature charging performance of batteries. Moreover, the negative electrode plate can keep a high surface stability at the same time, which effectively reduce the side reaction of electrolyte, and also can reduce the side reaction between the negative active material and the transition metal dissolved from positive electrode, so that the battery also has a longer cycle life, even a longer high-temperature cycle life. Furthermore, the secondary battery may have a fast charging capability, and has a significantly reduced probability of lithium precipitation from the negative electrode when it is charged at a high rate.

In these embodiments, preferably, $0.04 \leq I_{3R(012)}/I_{2H(100)} \leq 15$. More preferably, $0.04 \leq I_{3R(012)}/I_{2H(100)} \leq 0.12$. For example, $I_{3R(012)}/I_{2H(100)}$ of the negative electrode plate can be 0.05, 0.06, 0.08, 0.10, 0.11 or 0.12. $I_{3R(012)}/I_{2H(100)}$ of the negative electrode plate being within an appropriate range enables the secondary battery to have a desired balance of a low-temperature charging performance and a high-temperature cycle performance.

In these embodiments, preferably, the positive active material include one or more of lithium nickel cobalt manganese oxide, lithium nickel cobalt aluminum oxide and its modified compounds. As such, above effects may be achieved well.

In some embodiments, the negative electrode plate also satisfies: $0.02 \leq I_{3R(011)}/I_{2H(101)} \leq 0.18$. It was found by inventors that, when the positive active material includes one or more of layered lithium transition metal oxides and modified compounds thereof, the negative active material includes artificial graphite and natural graphite both, and the negative electrode plate satisfies $0.02 \leq I_{3R(012)}/I_{2H(100)} \leq 0.18$, the $I_{3R(101)}/I_{2H(101)}$ of the negative electrode plate being within the appropriate range may further balance the ion transmission performance and surface stability of the negative electrode plate, thereby further improving the low-temperature charging performance and high-temperature cycle performance. Preferably, it is $0.04 \leq I_{3R(101)}/I_{2H(101)} \leq 0.15$. More preferably, it is $0.04 \leq I_{3R(101)}/I_{2H(101)} \leq 0.12$. For example, $I_{3R(101)}/I_{2H(101)}$ of the negative electrode plate can be 0.05, 0.06, 0.08, 0.10, 0.11 or 0.12.

The $I_{3R(101)}$ is a peak intensity of an X-ray diffraction peak of a 3R-phase 101 crystal plane of the negative electrode active material in the negative electrode plate, and the $I_{2H(101)}$ is a peak intensity of an X-ray diffraction peak of a 2H-phase 101 crystal plane of the negative electrode active material in the negative electrode plate. $I_{3R(101)}$ and $I_{2H(101)}$ can be obtained from an X-ray diffraction pattern test.

Further study by inventors indicates that, when the positive active material includes one or more of layered lithium transition metal oxides and modified compounds thereof, the negative active material includes artificial graphite and natural graphite both, and the negative electrode plate satisfies $0.02 \leq I_{3R(012)}/I_{2H(100)} \leq 0.18$, the performances of batteries can be further improved if the negative active material further satisfies with one or more of following conditions. Preferably, the positive active material include one or more of lithium nickel cobalt manganese oxide, lithium nickel cobalt aluminum oxide and its modified compounds.

In some preferred embodiments, the natural graphite constitutes >50% by mass of the negative electrode active material, preferably from 10% to 50% by mass. The negative active material comprises a proper amount of natural graphite, which can increase the peak intensity of an X-ray diffraction peak of a 3R-phase 101 crystal plane (such as 012 crystal plane and/or 101 crystal plane) of the negative electrode active material in the negative electrode plate, increase active ion transmission sites of negative electrode plate, and ensure that the negative electrode plate has a low side reaction, thereby further improving the low-temperature charging performance and high-temperature cycle life of batteries. The negative active material contains a proper amount of natural graphite, which can enable the negative active material to have higher gram capacity and increase the compacted density of the negative electrode film, thereby increasing the energy density of batteries.

Preferably, the natural graphite constitutes from 10% to 30%, more preferably from 15% to 25% by mass of the negative electrode active material. For example, the natural graphite constitutes 16%, 18%, 20%, 22%, 24%, 26% or 28% by mass of the negative electrode active material.

In some preferred embodiments, the average particle size WO of the negative active material is from 11 μm to 15 μm, more preferably from 12 μm to 14 μm. The $D_v50$ of the negative active material being within a proper range ensures that it has a higher gram capacity while reducing the side reaction on the surface of negative electrode plate, and shortening migration path of active ions and electrons in the particles, so that the active ions and electrons have a higher migration rate in the negative electrode plate, thereby enabling the battery to have a higher energy density and improved high-temperature cycle life and low-temperature charging performance.

In order to control $D_v50$ of the negative active material within the given range, and further improve the performance of batteries, in some embodiments, artificial graphite has a volume average particle size WO of preferably from 12 μm to 16 μm, and more preferably from 13 μm to 15 μm. Natural graphite has a volume average particle size $D_v50$ of preferably from 10 μm to 14 μm, and more preferably from 11 μm to 13 μm. The WO of natural graphite being within an appropriate range can increase the peak intensity of an X-ray diffraction peak of a 3R-phase 101 crystal plane (such as 012 crystal plane and/or 101 crystal plane) of the negative electrode active material in the negative electrode plate, increase active ion transmission sites of negative electrode plate, and ensure that the negative electrode plate has a low side reaction activity, thereby further improving the low-temperature charging performance and high-temperature cycle life of batteries.

In some preferred embodiments, the tap density of the negative active material is ≥1.1 g/cm³ and preferably from 1.1 g/cm³ to 1.15 g/cm³. The tap density of the negative active material within the proper range enables the negative electrode film adopting it to have a higher compacted density and to have a higher active ions and electrons transmission performance, thereby improving the energy density and low-temperature charging performance of batteries. Moreover, the negative electrode plate can also obtain a higher cohesion and adhesion power, which can reduce the volume expansion of batteries during the high-temperature cycle, thereby improving the high-temperature cycle life of batteries.

In order to make the tap density of negative active materials within the given range and further improve performances of batteries, in some preferred embodiments, the tap density of artificial graphite is from 1.0 g/cm³ to 1.3 g/cm³, preferably from 1.1 g/cm³ to 1.2 g/cm³, and the tap density of natural graphite is from 0.90 g/cm³ to 1.2 g/cm³, preferably from 1.0 g/cm³ to 1.15 g/cm³.

In some preferred embodiments, the graphitization degree of negative active material is from 92% to 96%, preferably from 93% to 95%. The graphitization degree of the negative active material is within a proper range, which can make it have a higher gram capacity, but also have a larger interlayer spacing and thus reduce the diffusion resistance of active ions inside the negative active material. Moreover, in the negative electrode plate prepared using the negative active material, there is a large contact area between the negative active material particles and between the negative active material and the negative electrode current collector, so that the transmission capacity of active ions and electrons in the negative electrode plate is further improved, thereby further enhancing the low-temperature charging performance of batteries. Besides, the negative electrode is provided with a higher cohesion and adhesion power, thereby further advancing the high-temperature cycle performance of batteries.

In order to make the graphitization degree of negative active material within the above range, and further improve performances of batteries, in some preferred embodiments, the graphitization degree of artificial graphite can be from 90% to 95%, preferably from 91% to 93%; the graphitization degree of natural graphite can be from 95% to 98%, preferably from 95% to 97%.

Further study by inventors indicates that, when the positive active material includes one or more of layered lithium transition metal oxides and modified compounds thereof, the negative active material includes artificial graphite and natural graphite both, and the negative electrode plate satisfies $0.02 \leq I_{3R(012)}/I_{2H(100)} \leq 0.18$, the performances of batteries can be further improved if the negative electrode film further satisfies with one or more of following conditions. Preferably, the positive active material include one or more of lithium nickel cobalt manganese oxide, lithium nickel cobalt aluminum oxide and its modified compounds.

In some preferred embodiments, the areal density of negative electrode film was from 10 mg/cm² to 13 mg/cm², more preferably from 10.5 mg/cm² to 11.5 mg/cm². When the areal density of negative electrode film is within the given range, the battery can obtain a higher energy density. At the same time, the battery further have a better active ions and electrons transmission performance, thereby further improving the low-temperature charging performance of batteries. Further, when the negative electrode plate satisfies the above design, the polarization and side reaction of negative electrode can be reduced, thereby further improving the high-temperature cycle performance of batteries.

In some preferred embodiments, the compacted density of negative electrode film is from 1.6 g/cm³ to 1.8 g/cm³, more preferably from 1.65 g/cm³ to 1.75 g/cm³, and especially preferably from 1.65 g/cm³ to 1.7 g/cm³. When the compacted density of negative electrode film is within the given range, the battery can be guaranteed to obtain a higher energy density. At the same time, the close contact among the negative active material particles can effectively reduce resistance of the negative electrode film, thereby further elevating the low-temperature charging performance of batteries. A proper compacted density can also maintain the structural integrity of particles of negative active material, is conducive to improving the cohesion and adhesion power of negative electrode plate and reduces the expansion and side reaction during the battery cycle, thereby further increasing the cycle life and safety performance of the battery.

Further study by inventors indicates that, when the positive active material of the positive electrode plate includes lithium containing phosphates with olivine structure and/or modified compound thereof, the negative electrode plate satisfies $0.04 \leq I_{3R(012)}/I_{2H(100)} \leq 0.22$.

When the positive active material includes one or more of lithium containing phosphates with olivine structure and modified compounds thereof, the negative active material of the negative electrode plate include artificial graphite and natural graphite both, and the negative electrode plate satisfies $0.04 \leq I_{3R(012)}/I_{2H(100)} \leq 0.22$, the negative electrode plate have more active ion transmission sites, the dynamic performance of intercalated and deintercalated active ions in the negative electrode plate is apparently improved and even in a low-temperature environment, these ions also can have a higher active ion diffusion rate so that the active ions from positive electrode may be accepted quickly, thereby improving low-temperature charging performance of secondary batteries. Moreover, the negative electrode plate can keep a high surface stability at the same time, which reduce the side reaction of electrolyte, so that the battery also has a longer high-temperature cycle life. Furthermore, the secondary battery may have a fast charging capability, and has a significantly reduced probability of lithium precipitation from the negative electrode when it is charged at a high rate.

In these embodiments, preferably, $0.05 < I_{3R(012)}/I_{2H(100)} < 0.2$. More preferably, $0.06 \leq I_{3R(012)}/I_{2H(100)} \leq 0.18$. For example, $I_{3R(012)}/I_{2H(100)}$ of the negative electrode plate can be 0.07, 0.08, 0.09, 0.10, 0.11, 0.12, 0.13, 0.14, 0.15 or 0.16. $I_{3R(012)}/I_{2H(100)}$ of the negative electrode plate being within an appropriate range enables the secondary battery to have a desired balance of a low-temperature charging performance and a high-temperature cycle performance.

In these embodiments, preferably, the positive active material include one or more of lithium iron phosphate, a composition of lithium iron phosphate with carbon, and its modified compounds. As such, above effects may be achieved well.

In some embodiments, the negative electrode plate also satisfies: $0.04 \leq I_{3R(011)}/I_{2H(101)} \leq 0.22$. It was found by inventors that, when the positive active material includes one or more of lithium containing phosphates with olivine structure and modified compounds thereof, the negative active material includes artificial graphite and natural graphite both, and the negative electrode plate satisfies $0.04 \leq I_{3R(012)}/I_{2H(100)} \leq 0.22$, the $I_{3R(101)}/I_{2H(101)}$ of the negative electrode plate being within an appropriate range may further balance the ion transmission performance and surface stability of the negative electrode plate, thereby further improving the low-temperature charging performance and high-temperature cycle performance. Preferably, it is $0.05 \leq I_{3R(101)}/I_{2H(101)} \leq 0.2$. More preferably, it is $0.06 \leq I_{3R(101)}/I_{2H(101)} \leq 0.18$. For example, the $I_{3R(101)}$ of negative electrode plate can be 0.07, 0.08, 0.09, 0.10, 0.11, 0.12, 0.13, 0.14, 0.15 or 0.16.

Further study by inventors indicates that, when the positive active material includes one or more of lithium containing phosphates with olivine structure and its modified compounds, the negative active material includes artificial graphite and natural graphite both, and the negative electrode plate satisfies $0.04 \leq I_{3R(012)}/I_{2H(100)} \leq 0.22$, the performances of batteries can be further improved if the negative active material further satisfies with one or more of following conditions. Preferably, the positive active material include one or more of lithium iron phosphate, a composition of lithium iron phosphate with carbon and its modified compounds.

In some preferred embodiments, the natural graphite constitutes ≥50% by mass of the negative electrode active material, preferably from 20% to 50% by mass. The negative active material comprises a proper amount of natural graphite, which can increase the peak intensity of an X-ray diffraction peak of a 3R-phase 101 crystal plane (such as 012 crystal plane and/or 101 crystal plane) of the negative electrode active material in the negative electrode plate, increase active ion transmission sites of negative electrode plate, and ensure that the negative electrode plate has a low side reaction activity, thereby further improving the low-temperature charging performance and high-temperature cycle life of batteries. The negative active material contains a proper amount of natural graphite, which can enable the negative active material to have higher gram capacity and can increase the compacted density of the negative electrode film, thereby increasing the energy density of batteries.

Preferably, the natural graphite constitutes from 30% to 50%, more preferably from 35% to 50% by mass of the negative electrode active material. For example, the natural graphite constitutes 25%, 30%, 35%, 40%, or 45% by mass of the negative electrode active material.

In some preferred embodiments, the average particle size W0 of the negative active material is from 15 µm to 19 µm, more preferably from 16 µm to 18 µm. The $D_v50$ of the negative active material being within a proper range ensures that it has a higher gram capacity while reducing the side reaction on the surface of negative electrode plate, and shortening migration path of active ions and electrons in the particles, so that the active ions and electrons have a higher migration rate in the negative electrode plate, thereby enabling the battery to have a higher energy density and an improved high-temperature cycle life and low-temperature charging performance.

In order to control $D_v50$ of the negative active material within the given range, and further improve the performance of batteries, in some embodiments, artificial graphite has a volume average particle size $D_v50$ of preferably from 14 µm to 18 µm, and more preferably from 15 µm to 17 µm. Natural graphite has a volume average particle size $D_v50$ of preferably from 15 µm to 19 µm, and more preferably from 16 µm to 18 µm. The $D_v50$ of natural graphite being within an appropriate range can increase the peak intensity of an X-ray diffraction peak of a 3R-phase 101 crystal plane (such as 012 crystal plane and/or 101 crystal plane) of the negative electrode active material in the negative electrode plate, increase active ion transmission sites of negative electrode plate, and ensure that the negative electrode plate has a lower side reaction activity, thereby further improving the low-temperature charging performance and high-temperature cycle life of batteries.

In some preferred embodiments, the tap density of the negative active material is ≤1.1 g/cm³ and preferably from 1.0 g/cm³ to 1.09 g/cm³. The tap density of the negative active material within the proper range enables the negative electrode film adopting it to have a higher compacted density and to have a higher active ions and electrons transmission performance, thereby improving the energy density and low-temperature charging performance of batteries. Moreover, the negative electrode plate can also obtain a higher cohesion and adhesion power, which can reduce the volume expansion of batteries during the high-temperature cycle, thereby improving the high-temperature cycle life of batteries.

In order to make the tap density of negative active materials within the given range and further improve performances of batteries, the tap density of artificial graphite is from 0.9 g/cm³ to 1.1 g/cm³, preferably from 0.95 g/cm³ to 1.05 g/cm³, and the tap density of natural graphite is from 0.90 g/cm³ to 1.15 g/cm³, preferably from 0.9 g/cm³ to 1.1 g/cm³ and especially preferably from 1.0 g/cm³ to 1.1 g/cm³.

In some preferred embodiments, the graphitization degree of negative active material is from 92% to 95%, preferably from 93% to 94%. The graphitization degree of the negative active material is within a proper range, which can make it have a higher gram capacity, but also have a larger interlayer spacing and thus reduce the diffusion resistance of active ions inside the negative active material. Moreover, in the negative electrode plate prepared using the negative active material, there is a large contact area between the negative active material particles and between the negative active material and the negative electrode current collector, so that the transmission capacity of active ions and electrons in the negative electrode plate is further improved, thereby further enhancing the low-temperature charging performance of batteries. Besides, the negative electrode is provided with a higher cohesion and adhesion power, thereby further advancing the high-temperature cycle performance of batteries.

In order to make the graphitization degree of negative active material within the above range, and further improve performances of batteries, in some preferred embodiments, the graphitization degree of artificial graphite can be from 90% to 95%, preferably from 91% to 93%; the graphitization degree of natural graphite can be from 95% to 98.5%, preferably from 96% to 97%.

Further study by inventors indicates that, when the positive active material includes one or more of lithium containing phosphates with olivine structure and its modified compounds, the negative active material includes artificial graphite and natural graphite both, and the negative electrode plate satisfies $0.04 \leq I_{3R(012)}/I_{2H(100)} \leq 0.22$, the performances of batteries can be further improved if the negative electrode film further satisfies with one or more of following conditions. Preferably, the positive active material include one or more of lithium iron phosphate, a composite of lithium iron phosphate with carbon and its modified compounds.

In some preferred embodiments, the areal density of negative electrode film was from 7 mg/cm² to 10 mg/cm², more preferably from 7 mg/cm² to 8 mg/cm². When the areal density of negative electrode film is within the given range, the battery can obtain a higher energy density. At the same time, the battery further have a better active ions and electrons transmission performance, thereby further improving the low-temperature charging performance of batteries. Further, when the negative electrode film satisfies the above design, the polarization and side reaction can be reduced, thereby further improving the high-temperature cycle performance of batteries.

In some preferred embodiments, the compacted density of negative electrode film is from 1.5 g/cm³ to 1.7 g/cm³, more preferably from 1.55 g/cm³ to 1.6 g/cm³. When the compacted density of negative electrode film is within the given range, the battery can be provided with a higher energy density. At the same time, the close contact among the negative active material particles can effectively reduce the resistance of negative electrode film, thereby further elevating the low-temperature charging performance of batteries.

Moreover, a proper compacted density can also maintain the structural integrity of negative active material particles, is conducive to improving the cohesion and adhesion power of negative electrode plate and reduces the expansion and side reaction during the battery cycle, thereby further increasing the cycle life and safety performance of the battery.

In this application, the $I_{3R(012)}/I_{2H(100)}$, $I_{3R(101)}/I_{2H(101)}$ of negative electrode plate can be provided within the given range by regulating one or more of selection of artificial graphite, selection of natural graphite, the ratio of artificial graphite and natural graphite, particle size of natural graphite, and the like. The selection of artificial graphite and natural graphite can include independently but not limited to one or more of their graphitization degree, particle size distribution, tap density and surface coating modification and the like.

In any of negative electrode plate of the present application, the negative active material may optionally further include one or more of hard carbon, soft carbon, silicon-based materials, tin-based materials.

In some embodiments, the negative electrode film may also include a binder. As an example, the binder used for the negative electrode film can be one or more selected from polyacrylic acid (PAA), sodium polyacrylate (PAAS), polyacrylamide (PAM), polyvinyl alcohol (PVA), styrene butadiene rubber (SBR), sodium alginate (SA), polymethylacrylic acid (PMAA) and carboxymethyl chitosan (CMCS).

In some embodiments, the negative electrode film may optionally include a thickener. As an example, the thickener may be sodium carboxymethyl cellulose (CMC-Na).

In some embodiments, the negative electrode film may optionally include a conductive agent. As an example, the conductive agent for the negative electrode film may be one or more selected from superconducting carbon, acetylene black, carbon black, Ketjen black, carbon dots, carbon nanotubes, graphene, and carbon nanofibers.

It should be noted that that the parameters for negative electrode film given in this application refer to the parameters of single side electrode film. When the negative electrode films are disposed on the two surfaces of the current collector, the parameters of the negative electrode film on either surfaces satisfying the present application is considered as falling within the protection scope of the present application. Moreover, the range of $I_{3R(012)}/I_{2H(100)}$, $I_{3R(101)}/I_{2H(101)}$, compacted density, areal density and so on mentioned in this application refer to the range of parameters for the electrode films used to assemble secondary batteries after cold pressing.

Herein, the peak intensity of X-ray diffraction peak is expressed by the integral area of the corresponding diffraction peak in the measurement of $I_{3R(012)}/I_{2H(100)}$, $I_{3R(101)}/I_{2H(101)}$ of the negative electrode plate. The peak intensity $I_{3R(012)}$, $I_{2H(100)}$, $I_{3R(101)}$ and $I_{2H(101)}$ of X-ray diffraction peaks can be determined by instruments and methods known in the art. For example, an X-ray powder diffractometer is used to measure the X-ray diffraction spectrum according to general rule of X-ray diffraction analysis of JIS K0131-1996. For example, X'pert PRO type X-ray diffractometer of PANalytical, Netherlands is used with $CuK_\alpha$, ray as a radiation source, having a wavelength of $\lambda=1.5406$ Å and a $2\theta$ angle scanning range of from 15° to 80°, with a scanning rate of 4°/min.

the 3R phase 012 crystal plane of the negative active material has an $2\theta$ angle of from 46.03° to 46.63°, for example, 46.33°; the 2H phase 100 crystal plane has an $2\theta$ angle of from 42.06° to 42.66° for example 42.36°; the 3R phase 101 crystal plane has an $2\theta$ angle of from 43.15° to 43.75°, for example 43.45°; and the 2H phase 101 crystal plane has an $2\theta$ angle of from 44.16° to 44.76° for example 44.46°.

The graphitization degree has the meaning known in the art, and can be measured by instruments and methods known in the art. For example, $d_{002}$ can be measured by an X-ray powder diffractometer (such as X'pert PRO type X-ray diffractometer of PANalytical, Netherlands), and then the graphitization degree G is calculated according to the formula of $G=(0.344-d_{002})/(0.344-0.3354)\times 100\%$, where $d_{002}$ is a nano-scale interlayer spacing in the crystal structure of the graphite material.

The volume average particle size $D_v50$ has the meaning known in the art, being referred as to the particle size at which the material reaches 50% of cumulative volume distribution percentage, and can be measured by instruments and methods known in the art. For example, $D_v50$ can be conveniently measured by a laser particle size analyzer, such as Mastersizer 2000E type laser particle size analyzer of Malvern Instruments Co., Ltd., UK, with reference to the GB/T19077-2016 particle size distribution laser diffraction method.

The tap density has the meaning known in the art, and can be measured by instruments and methods known in the art. For example, with reference to the standard GB/T 5162-2006, a powder tap density tester (such as Bettersize BT-301) can be used for testing.

The areal density of the negative electrode film has the meaning known in the art, and can be measured by instruments and methods known in the art. For example, take the negative electrode plate subjected to a single-side coating and cold pressing (if the negative electrode plate is subjected to a double-side coating, one side of the negative electrode film can be wiped off firstly), cut it into small disks with an area of S 1, and get the weight recorded as M1. Then the negative electrode film of the weighed negative electrode plate is wiped off and the negative electrode current collector is weighed and recorded as M0. The areal density of the negative electrode film is determined as (weight of negative electrode plate M1—weight of negative electrode current collector M0)/S1.

The compacted density of the negative electrode film has the meaning known in the art, and can be measured by instruments and methods known in the art. For example, take the negative electrode plate subjected to a single-side coating and cold pressing, measure the thickness of the negative electrode film and determine the areal density of the negative electrode film according to the above test method. The compacted density of negative electrode film =areal density of negative electrode film/thickness of negative electrode film.

[Electrolyte]

Electrolytes act as conducting ions between the positive electrode plate and the negative electrode plate. This application has no specific restrictions on the type of electrolyte, which can be selected according to requirements. For example, electrolytes can be at least one selected from a solid electrolyte and a liquid electrolyte, i.e. electrolytic solution.

In some embodiments, the electrolytic solution is used as an electrolyte. The electrolytic solution includes electrolyte salts and solvents.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

In some embodiments, the organic solvent may be one or more selected from ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

In some embodiments, the electrolytic solution may further optionally include additives. For example, the additives may include negative electrode film-forming additives, positive electrode film-forming additives, and additives that can improve some performances of the battery, such as additives that improve overcharge performance of the battery, additives that improve high-temperature performance of the battery, and additives that improve low-temperature performance of the battery.

[Separator]

Secondary batteries using an electrolytic solution, as well as some secondary batteries using solid electrolytes, also include a separator. The separator is arranged between the positive electrode plate and the negative electrode plate, which acts as isolation. This application has no special restrictions on the type of separators, and any well-known porous structure separator with good chemical and mechanical stability can be selected. In some embodiments, the separator may be one or more selected from fiberglass film, non-woven film, polyethylene (PE) film, polypropylene (PP) film, polyvinylidene fluoride film and their multilayer composite film.

Figure 1:
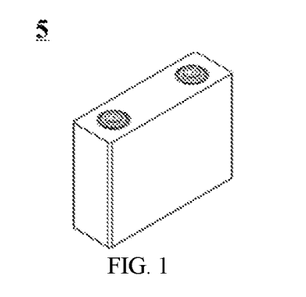
FIG. 1 is a schematic diagram of an embodiment of a secondary battery.

The present application does not have particular limitation to the shape of the secondary battery. The secondary battery may be cylindrical, square, or in other arbitrary shape. FIG. 1 shows a secondary battery 5 with a square structure as an example.

In some embodiments, the secondary battery may include an outer package for packaging the positive electrode plate, the negative electrode plate, and the electrolyte.

Figure 2:
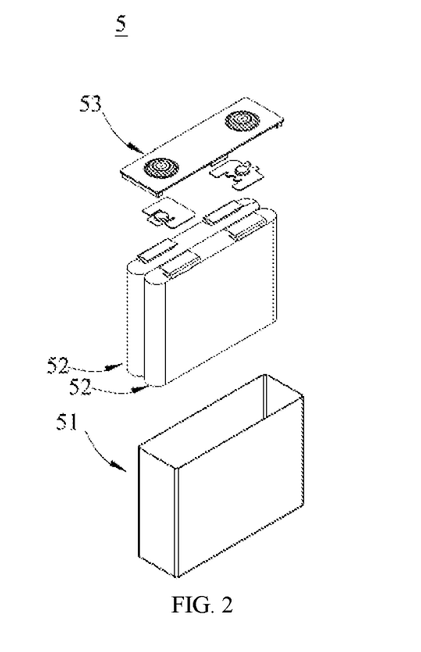
FIG. 2 is an exploded view of FIG. 1.

In some embodiments, referring to FIG. 2, the outer package may include a shell 51 and a cover plate 53. The shell 51 may include a bottom plate and side plates connected to the bottom plate, and the bottom plate and the side plates enclose a receiving cavity. The shell 51 has an opening communicated with the receiving cavity, and the cover plate 53 can cover the opening to close the receiving cavity.

The positive electrode plate, the negative electrode plate, and the separator may form an electrode assembly 52 by stacking or winding. The electrode assembly 52 is packaged in the receiving cavity. The electrolyte may adopt an electrolytic solution, and the electrolyte liquid infiltrates the electrode assembly 52. The secondary battery 5 includes one or more electrode assemblies 52, which can be adjusted according to requirements.

In some embodiments, the outer package of the secondary battery may be a hard case, such as a hard plastic case, an aluminum case, a steel case, and the like. The outer package of the secondary battery may also be a soft bag, such as a pocket type soft bag. The material of the soft bag may be plastic, for example, it may include one or more of polypropylene (PP), polybutylene terephthalate (PBT), polybutylene succinate (PBS), and the like.

In some embodiments, the secondary batteries may be assembled into a battery module, the battery module may include a plurality of secondary batteries, and the specific number can be adjusted according to the application and capacity of the battery module.

Figure 3:
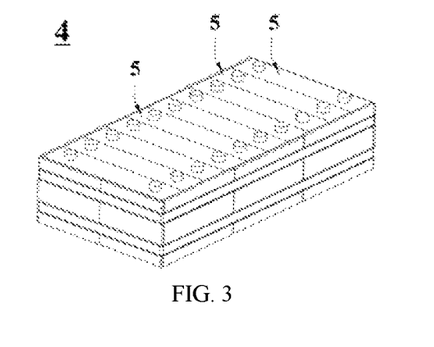
FIG. 3 is a schematic diagram of an embodiment of a battery module.

FIG. 3 shows a battery module 4 as an example. Referring to FIG. 3, in the battery module 4, a plurality of secondary batteries 5 may be arranged sequentially in a length direction of the battery module 4. Of course, they may also be arranged in any other way. Further, a plurality of secondary batteries 5 may be fixed by fasteners.

Optionally, the battery module 4 may further include a housing having a receiving space, and a plurality of secondary batteries 5 are received in the receiving space.

In some embodiments, the above-mentioned battery module may also be assembled into a battery pack, and the number of battery modules included in the battery pack can be adjusted according to the application and capacity of the battery pack.

Figure 4:
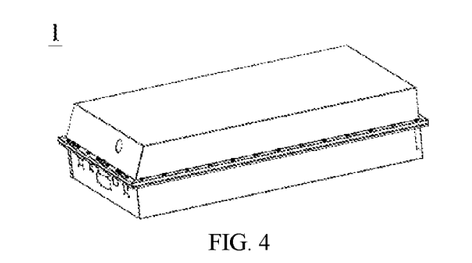
FIG. 4 is a schematic diagram of an embodiment of a battery pack.
Figure 5:
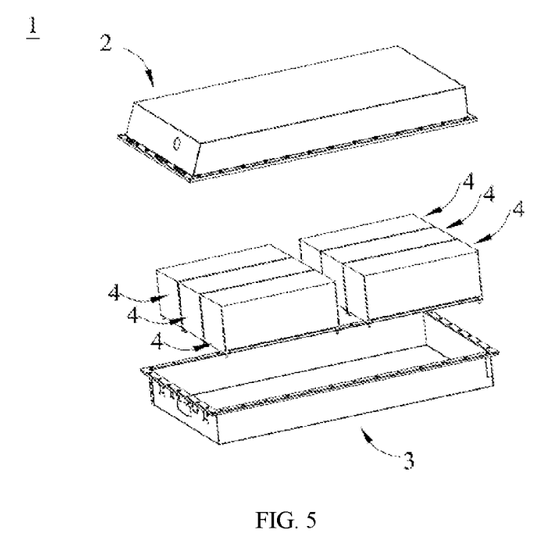
FIG. 5 is an exploded view of FIG. 4.

FIGS. 4 and 5 show a battery pack 1 as an example. Referring to FIGS. 4 and 5, the battery pack 1 may include a battery case and a plurality of battery modules 4 disposed in the battery case. The battery case includes an upper case body 2 and a lower case body 3. The upper case body 2 can cover the lower case body 3 to form a closed space for receiving the battery modules 4. A plurality of battery modules 4 can be arranged in the battery case in any manner.

[Preparation]

The preparation method of the secondary battery may include the step of assembling the negative electrode plate, the positive electrode plate and the electrolyte into a secondary battery. In some embodiments, the positive electrode plate, the separator and the negative electrode plate are stacked or wound in order in which the separator is disposed between the positive and negative electrode plates to serve as an isolation, thereby obtaining an electrode assembly, i.e. a battery core; and the electrode assembly is placed in a package housing, injected with the electrolyte, and sealed to prepare the secondary battery.

In some embodiments, the preparation of secondary battery may also include the steps of preparing a positive electrode plate. As an example, the positive electrode plate can be obtained by dispersing a positive active material, a conductive agent and a binder into a solvent (for example, N-methylpyrrolidone, abbreviated as NMP) to form a uniform positive electrode slurry; the positive electrode slurry is coated on the positive electrode current collector followed by drying and cold pressing, thereby obtaining the positive electrode plate.

In some embodiments, the preparation of secondary battery may also include the step of preparing a negative electrode plate. As an example, the negative electrode plate can be obtained by dispersing a negative active material, a binder, an optional thickener and conductive agent into a solvent in which the solvent is deionized water to form a uniform negative electrode slurry; the negative electrode slurry is coated on the negative electrode current collector followed by drying and cold pressing, thereby obtaining the negative electrode plate.

[Apparatus]

The second aspect of the present application provides an apparatus, the apparatus including any one or more secondary batteries according to the first aspect of the present application. The secondary battery can be used as a power source of the apparatus, and as an energy storage unit of the apparatus. The apparatus may be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like.

The apparatus may select the secondary battery, the battery module, or the battery pack according to its usage requirements.

Figure 6:
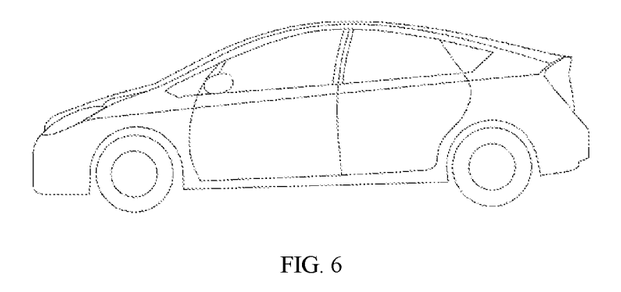
FIG. 6 is a schematic diagram of an embodiment of an apparatus using the secondary battery as a power source.

FIG. 6 shows an apparatus as an example. The apparatus is a pure electric vehicle, a hybrid electric vehicle, or a plug-in hybrid electric vehicle. In order to meet the requirements of the apparatus for high power and high energy density of the secondary battery, a battery pack or a battery module may be used.

As another example, the apparatus may be a mobile phone, a tablet computer, a notebook computer, and the like. The apparatus is generally required to be thin and light, and the secondary battery can be used as a power source.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Example 1

Preparation of a Positive Electrode Plate

A positive electrode active material $LiNi_{0.8}Co_{0.1}Mn_{0.1}O_2$ abbreviated as to NCM 811, a conductive agent Super P and a binder PVDF at a mass ratio of 96.5:1.5:2 were dispersed in NMP with stirring to form a uniform positive slurry, and then an aluminum foil as a positive electrode current collector was coated with the positive electrode slurry, thereby obtaining a positive electrode plate after steps of drying, cold pressing and the like.

Preparation of a Negative Electrode Plate

Artificial graphite and natural graphite were mixed in a mass ratio as shown in table 1 and then the resulting mixture was further mixed with a conductive agent Super P, a binder SBR and a thickener CMC-Na at a mass ratio of 96.2:0.8: 1.8:1.2 in an appropriate amount of deionized water to form a uniform negative slurry; and a Cu foil as a negative electrode current collector was coated with the negative slurry, thereby obtaining a negative electrode plate after steps of drying, cold pressing and the like.

Separator

Use a PE/PP composite film as separator.

Preparation of an Electrolyte

Ethylene carbonate (EC), ethyl methyl carbonate (EMC), and diethyl carbonate (DEC) at a volume ratio of 1:1:1 were mixed, and then $LiPF_6$ was dissolved uniformly in the solution to obtain an electrolytic solution, wherein $LiPF_6$ had a concentration of 1 mol/L.

Preparation of a Secondary Battery

The positive electrode plate, the separator and the negative electrode plate were stacked and wound into an electrode assembly, which was put into a package housing, and in which the electrolyte was injected followed by sealing, standing, formation and aging, thereby obtaining a secondary battery Examples 2 to 27 and Comparative Examples 1 to 4

The preparation method was similar to that of Example 1 with the exception that the parameters for the preparation process of the negative electrode plate were adjusted, as shown in Table 1 and Table 2; and that the positive active material of the Examples 14-27 and Comparative Examples 3 to 4 was replaced with lithium iron phosphate (abbreviated as LFP). Thus, the corresponding secondary batteries were obtained.

Test Section

For the following tests, the discharge cut-off voltage is 2.8V and the charge cut-off voltage is 4.2V when the positive active material is NCM811, the discharge cut-off voltage is 2.5V and the charge cut-off voltage is 3.65V when the positive active material is lithium iron phosphate LFP.

1) Test of high-temperature cycle performance of battery

At a temperature of 60° C., the batteries were subjected to the first charge at a charge current of 1.0 C (i.e. the current value at which the theoretical capacity is completely discharged within 1 hour) until the charge cut-off voltage, and then were subjected to a constant discharge at a discharge current of 1.0 C, until the discharge cut-off voltage, which was a charge and discharge cycle. The discharge capacity of this cycle is the discharge capacity for the first cycle. Then, continuous charge and discharge cycles were performed, the discharge capacity values for each cycle were recorded, and the capacity retention rates after each cycle were calculated according to the capacity retention rate for the N cycles= (discharge capacity of the Nth cycle/discharge capacity of the 1st cycle) X100%. When the cycle capacity was reduced to 80%, the number of cycles was recorded to characterize the high-temperature cycle performance of batteries.

2) Test of low-temperature charging performance of battery

At a temperature of 25° C., the batteries were subjected to discharging at a constant discharge current of 1.0 C until the discharge cut-off voltage, then were subjected to charging at a charge current of 1.0 C, until the charge cut-off voltage, and continued to charge at a constant voltage to a current of 0.05 C. At this time, the battery was fully charged, that is 100% SOC (State of Charge). After the fully charged battery was set standing for 5 minutes, the battery was discharged to the discharge cut-off voltage with a constant current of 1.0 C. At this time, the discharge capacity was the actual capacity of the battery under 1.0C, which was recorded as Co. Then, the battery at a temperature of −10° C. was charged with an xCo constant current to charge cut-off voltage, then charged at a constant voltage to a current of 0.05 Co. After setting standing for 5 minutes, the battery was disassembled to observe precipitation of lithium. If there is no lithium precipitation on the surface of the negative electrode plate, the rate of charge will be increased for testing again until there is lithium precipitation on the surface of the negative electrode plate. The maximum rate of charge was recorded at which there was no lithium precipitation on the surface of the negative electrode plate to determine the rate of lithium precipitation at low temperature, thereby characterizing the low-temperature charging performance of batteries.

TABLE 1

| No. | Artificial Graphite | | | | Natural Graphite | | | | Negative electrode Plate | | | Low-temperature charging performance | High-temperature cycle performance |
| | Mass Ratio, % | Dv50, μm | Tap density g/cm$^3$ | Graphitization, % | Mass Ratio, % | Dv50 μm | Tap density g/cm$^3$ | Graphitization, % | $I_{3R(012)}/I_{2H(100)}$ | Compacted density, g/cm$^3$ | Areal density mg/cm$^2$ | | |
|---|---|---|---|---|---|---|---|---|---|---|---|---|---|
| Example 1 | 75 | 16.0 | 1.22 | 94.2 | 25 | 14.0 | 1.06 | 98.0 | 0.02 | 1.7 | 11.0 | 0.45 Co | 1050 |
| Example 2 | 75 | 15.0 | 1.2 | 93.8 | 25 | 12.0 | 1.05 | 98.0 | 0.04 | | | 0.48 Co | 1230 |
| Example 3 | 75 | 13.0 | 1.15 | 93.0 | 25 | 11.0 | 1.02 | 98.0 | 0.08 | | | 0.57 Co | 1360 |
| Example 4 | 75 | 13.0 | 1.15 | 93.0 | 25 | 11.0 | 1.05 | 98.0 | 0.10 | | | 0.55 Co | 1340 |
| Example 5 | 75 | 13.0 | 1.15 | 93.0 | 25 | 10.0 | 1.07 | 98.0 | 0.12 | | | 0.52 Co | 1250 |
| Example 6 | 75 | 13.0 | 1.15 | 93.0 | 25 | 10.0 | 1.12 | 98.0 | 0.18 | | | 0.5 Co | 1000 |
| Example 7 | 90 | 13.0 | 1.15 | 93.0 | 10 | 11.0 | 1.05 | 98.0 | 0.03 | | | 0.41 Co | 1480 |
| Example:8 | 80 | 13.0 | 1.15 | 93.0 | 20 | 11.0 | 1.05 | 98.0 | 0.08 | | | 0.59 Co | 1340 |
| Example 9 | 70 | 13.0 | 1.15 | 93.0 | 30 | 11.0 | 1.05 | 98.0 | 0.13 | | | 0.5 Co | 1190 |
| Example 10 | 75 | 13.0 | 1.15 | 93.0 | 25 | 11.0 | 1.05 | 98.0 | 0.07 | 1.6 | 11.0 | 0.55 Co | 1360 |
| Example 11 | 75 | 13.0 | 1.15 | 93.0 | 25 | 11.0 | 1.05 | 98.0 | 0.09 | 1.8 | 11.0 | 0.5 Co | 1300 |
| Example 12 | 75 | 13.0 | 1.15 | 93.0 | 25 | 11.0 | 1.05 | 98.0 | 0.08 | 1.7 | 10.0 | 0.59 Co | 1340 |
| Example 13 | 75 | 13.0 | 1.15 | 93.0 | 25 | 11.0 | 1.05 | 98.0 | 0.08 | 1.7 | 13.0 | 0.47 Co | 1075 |
| Comparative Example 1 | 100 | 13.0 | 1.15 | 93.0 | 0 | / | / | / | 0.00 | 1.7 | 11.0 | 0.3 Co | 1000 |
| Comparative Example 2 | 60 | 13.0 | 1.15 | 93.0 | 40 | 13.0 | 1.15 | 98.0 | 0.20 | 1.7 | 11.0 | 0.4 Co | 940 |

In Table 1: the positive active material of batteries was NCM811, and the compacted density of the positive electrode film was 3.5 g/cm$^3$. The areal density was 17 mg/cm$^2$.

TABLE 2

| No. | Artificial Graphite | | | | Natural Graphite | | | | Negative Electrode Plate | | | Low-temperature charging performance | High-temperature cycle performance |
| | Mass Ratio, % | Dv50, μm | Tap density g/cm$^3$ | Graphitization, % | Mass Ratio, % | Dv50, μm | Tap density g/cm$^3$ | Graphitization, % | $I_{3R(012)}/I_{2H(100)}$ | Compacted density, g/cm$^3$ | Areal density mg/cm$^2$ | | |
|---|---|---|---|---|---|---|---|---|---|---|---|---|---|
| Example 14 | 55 | 18.0 | 1.06 | 92.0 | 45 | 19.0 | 1.00 | 98.5 | 0.04 | 1.6 | 7.5 | 0.48 Co | 950 |
| Example 15 | 55 | 15.0 | 1.00 | 92.0 | 45 | 19.0 | 1.05 | 98.5 | 0.06 | | | 0.55 Co | 1210 |
| Example 16 | 55 | 14.0 | 0.95 | 92.0 | 45 | 18.0 | 1.05 | 98.5 | 0.10 | | | 0.7 Co | 1330 |

TABLE 2-continued

| | Artificial Graphite | | | | Natural Graphite | | | | Negative Electrode Plate | | | Low-temperature charging performance | High-temperature cycle performance |
|---|---|---|---|---|---|---|---|---|---|---|---|---|---|
| No. | Mass Ratio, % | Dv50, μm | Tap density g/cm³ | Graphi-tization, % | Mass Ratio, % | Dv50, μm | Tap density g/cm³ | Graphi-tization, % | $I_{3R(012)}/I_{2H(100)}$ | Compacted density, g/cm³ | Areal density mg/cm² | | |
| Example 17 | 55 | 16.0 | 1.02 | 92.0 | 45 | 17.0 | 1.08 | 98.5 | 0.14 | | | 0.75 Co | 1420 |
| Example 18 | 55 | 15.0 | 1.00 | 92.0 | 45 | 16.0 | 1.10 | 98.5 | 0.18 | | | 0.7 Co | 1285 |
| Example 19 | 55 | 17.0 | 1.04 | 92.0 | 45 | 15.0 | 1.12 | 98.5 | 0.22 | | | 0.6 Co | 1125 |
| Example 20 | 80 | 16.0 | 1.02 | 92.0 | 20 | 17.0 | 1.08 | 98.5 | 0.04 | | | 0.5 Co | 1500 |
| Example 21 | 70 | 16.0 | 1.02 | 92.0 | 30 | 17.0 | 1.08 | 98.5 | 0.07 | | | 0.59 Co | 1390 |
| Example 22 | 60 | 16.0 | 1.02 | 92.0 | 40 | 17.0 | 1.08 | 98.5 | 0.11 | | | 0.65 Co | 1372 |
| Example 23 | 50 | 16.0 | 1.02 | 92.0 | 50 | 17.0 | 1.08 | 98.5 | 0.16 | | | 0.78 Co | 1325 |
| Example 24 | 55 | 16.0 | 1.02 | 92.0 | 45 | 17.0 | 1.08 | 98.5 | 0.13 | 1.5 | 7.5 | 0.63 Co | 1340 |
| Example 25 | 55 | 16.0 | 1.02 | 92.0 | 45 | 17.0 | 1.08 | 98.5 | 0.15 | 1.7 | 7.5 | 0.6 Co | 1200 |
| Example 26 | 55 | 16.0 | 1.02 | 92.0 | 45 | 17.0 | 1.08 | 98.5 | 0.14 | 1.6 | 7.0 | 0.75 Co | 1320 |
| Example 27 | 55 | 16.0 | 1.02 | 92.0 | 45 | 17.0 | 1.08 | 98.5 | 0.14 | 1.6 | 10.0 | 0.56 Co | 1220 |
| Comparative Example 3 | 90 | 16.0 | 1.02 | 92.0 | 10 | 17.0 | 1.08 | 98.5 | 0.02 | 1.6 | 7.5 | 0.35 Co | 948 |
| Comparative Example 4 | 55 | 16.0 | 1.02 | 92.0 | 45 | 8.0 | 1.05 | 98.5 | 0.25 | 1.6 | 7.5 | 0.45 Co | 680 |

In Table 2, the positive active material of batteries was lithium iron phosphate, the compacted density of the positive electrode film was 2.3 g/cm³ and the areal density was 16 mg/cm².

The results of the comparison between Examples 1-13 and Comparative Examples 1-2 showed that the secondary batteries had a higher high-temperature cycle performance and a higher low-temperature charging performance while having a higher energy density, when the positive electrode plate included one or more of layered lithium transition metal oxides and its modified compounds, the negative active material of the negative electrode plate included artificial graphite and natural graphite, and the negative electrode plate satisfied $0.02 \leq I_{3R(012)}/I_{2H100} \leq 0.18$, especially $0.04 \leq I_{3R(012)}/I_{2H(100)} \leq 0.12$.

The results of the comparison between Examples 14-27 and Comparative Examples 3-4 showed that the secondary battery had a higher high-temperature cycle performance and a higher low-temperature charging performance while having a higher energy density, when the positive electrode plate included one or more of lithium containing phosphates with olivine structure and its modified compounds, the negative active material of the negative electrode plate contained both artificial graphite and natural graphite, and the negative electrode plate satisfied $0.04 < I_{3R(012)}/I_{2H(100)} \leq 0.22$, especially $0.06 \leq I_{3R(012)}/I_{2H(100)} \leq 0.18$.

In addition, the results of Examples 7-9 and Examples 20-23 showed that the low-temperature charging performance and high-temperature cycle performance of batteries were further improved when the positive electrode plate comprised a specific positive active material, the negative active material of the negative electrode plate included both artificial graphite and natural graphite, and the mass ratio of natural graphite in the negative active material was within a certain range.

The results of Examples 10-13 and Examples 24-27 showed that the low-temperature charging performance and high-temperature cycle performance of batteries were further improved when positive electrode plate comprised a special positive active material, the negative electrode materials included artificial graphite and natural graphite, and the compacted density and/or areal density of negative electrode films were within a certain range.

Below are some exemplary embodiments of the present application.

Embodiment 1. A secondary battery, comprising a positive electrode plate and a negative electrode plate, the positive electrode plate comprising a positive electrode current collector and a positive electrode film disposed on at least one surface of the positive electrode current collector and comprising a positive active material; the negative electrode plate comprising a negative electrode current collector and a negative electrode film disposed on at least one surface of the negative electrode current collector and comprising a negative electrode active material, wherein the positive active material comprises one or more of layered lithium transition metal oxides and modified compounds thereof, and the negative electrode active material comprises artificial graphite and natural graphite, and the negative electrode plate satisfies $0.02 \leq I_{3R(012)}/I_{2H(100)} \leq 0.18$, preferably $0.04 \leq I_{3R(012)}/I_{2H(100)} \leq 0.12$, in which the $I_{3R(012)}$ is a peak intensity of an X-ray diffraction peak of a 3R-phase 012 crystal plane of the negative electrode active material in the negative electrode plate, and the $I_{2H(101)}$ is a peak intensity of an X-ray diffraction peak of a 2H-phase 100 crystal plane of the negative electrode active material in the negative electrode plate.

Embodiment 2. The secondary battery according to Embodiment 1, wherein the negative electrode plate further satisfies: $0.02 \leq I_{3R(101)}/I_{2H(101)} \leq 10.18$, preferably $0.04 \leq I_{3R(101)}/I_{2H(101)} \leq 0.12$, in which the $I_{3R(012)}$ is a peak intensity of an X-ray diffraction peak of a 3R-phase 101 crystal plane of the negative electrode active material in the negative electrode plate, and the $I_{2H(101)}$ is a peak intensity of an X-ray diffraction peak of a 2H-phase 101 crystal plane of the negative electrode active material in the negative electrode plate.

Embodiment 3. The secondary battery according to Embodiment 1 or 2, wherein the natural graphite constitutes ≤50% by mass of the negative electrode active material, preferably from 15% to 25% by mass.

Embodiment 4. The secondary battery according to any one of Embodiments 1-3, wherein the negative electrode active material has an average particle size Dv50 of from 11 μm to 15 μm, preferably from 12 μm to 14 μm.

Embodiment 5. The secondary battery according to any one of Embodiments 1-4, wherein the negative electrode active material has a tap density of ≥1.1 g/cm³, preferably from 1.1 g/cm³ to 1.15 g/cm³; and/or, the negative electrode active material has a graphitization degree of from 92% to 96%, preferably from 93% to 95%.

Embodiment 6. The secondary battery according to any one of Embodiments 1-5, wherein the negative electrode film has an areal density of from 10 mg/cm$^2$ to 13 mg/cm$^2$, preferably from 10.5 mg/cm$^2$ to 11.5 mg/cm$^2$; and/or, the negative electrode film has a compacted density of from 1.6 g/cm$^3$ to 1.8 g/cm$^3$, preferably from 1.65 g/cm$^3$ to 1.7 g/cm$^3$.

Embodiment 7. The secondary battery according to any one of Embodiments 1-6, wherein the layered lithium transition metal oxides comprise one or more of lithium nickel cobalt manganese oxide, lithium nickel cobalt aluminium oxide and modified compounds thereof.

Embodiment 8. A secondary battery, comprising a positive electrode plate and a negative electrode plate, the positive electrode plate comprising a positive electrode current collector and a positive electrode film disposed on at least one surface of the positive electrode current collector and comprising a positive active material; the negative electrode plate comprising a negative electrode current collector and a negative electrode film disposed on at least one surface of the negative electrode current collector and comprising a negative electrode active material;

wherein the positive active material comprises one or more of lithium-containing phosphates with olivine structure and modified compounds thereof; and the negative electrode active material comprises artificial graphite and natural graphite, and the negative electrode plate satisfies $0.04 \leq I_{3R(012)}/I_{2H(100)} \leq 0.22$ preferably $0.06 \leq I_{3R(012)}/I_{2H(100)} \leq 0.18$; and in which the $I_{3R(012)}$ is a peak intensity of an X-ray diffraction peak of a 3R-phase 012 crystal plane of the negative electrode active material in the negative electrode plate, and the $I_{2H(100)}$ is a peak intensity of an X-ray diffraction peak of a 2H-phase 100 crystal plane of the negative electrode active material in the negative electrode plate.

Embodiment 9. The secondary battery according to Embodiment 8, wherein the negative electrode plate further satisfies: $0.04 \leq I_{3R(101)}/I_{2H(101)} \leq 10.22$, preferably $0.06 \leq I_{3R(101)}/I_{2H(101)} \leq 0.18$;

in which the $I_{3R(101)}$ is a peak intensity of an X-ray diffraction peak of a 3R-phase 101 crystal plane of the negative electrode active material in the negative electrode plate, and the $I_{2H(101)}$ is a peak intensity of an X-ray diffraction peak of a 2H-phase 101 crystal plane of the negative electrode active material in the negative electrode plate.

Embodiment 10. The secondary battery according to Embodiment 8 or 9, wherein the natural graphite constitutes ≥20% by mass of the negative electrode active material by mass, preferably from 35% to 50% by mass.

Embodiment 11. The secondary battery according to any one of Embodiments 8-10, wherein the negative electrode active material has an average particle size Dv50 of from 15 μm to 19 μm, preferably from 16 μm to 18 μm.

Embodiment 12. The secondary battery according to any one of Embodiments 8-11, wherein the negative electrode active material has a tap density of <1.1 g/cm$^3$, preferably from 1.0 g/cm$^3$ to 1.09 g/cm$^3$; and/or, the negative electrode active material has a graphitization degree of from 92% to 95%, preferably from 93% to 94%.

Embodiment 13. The secondary battery according to any one of Embodiments 8-12, wherein the negative electrode film has an areal density of from 7 mg/cm$^2$ to 10 mg/cm$^2$, preferably from 7 mg/cm$^2$ to 8 mg/cm$^2$; and/or, the negative electrode film has a compacted density of from 1.5 g/cm$^3$ to 1.7 g/cm$^3$, preferably from 1.55 g/cm$^3$ to 1.6 g/cm$^3$.

Embodiment 14. The secondary battery according to any one of Embodiments 8-13, wherein the lithium-containing phosphates with olivine structure comprises one or more of lithium iron phosphate, composite materials of the lithium iron phosphate and a carbon, and modified compounds thereof.

Embodiment 15. An apparatus, comprising the secondary battery according to any one of Embodiments 1-14.

Described above are merely specific embodiments of the present application, but the protection scope of the present application is not limited to this. Any skilled person who is familiar with this art could readily conceive of various equivalent modifications or substitutions within the disclosed technical scope of the present application, and these modifications or substitutions shall fall within the protection scope of the present application. Therefore, the protection scope of the present application shall be subject to the protection scope of the claims.

What is claimed is:

1. A secondary battery, comprising a positive electrode plate and a negative electrode plate, the positive electrode plate comprising a positive electrode current collector and a positive electrode film disposed on at least one surface of the positive electrode current collector and comprising a positive active material; the negative electrode plate comprising a negative electrode current collector and a negative electrode film disposed on at least one surface of the negative electrode current collector and comprising a negative electrode active material, wherein the positive active material comprises one or more of layered lithium transition metal oxides and modified compounds thereof, and the negative electrode active material comprises artificial graphite and natural graphite, and the negative electrode plate satisfies $0.02 \leq I_{3R(012)}/I_{2H(100)} \leq 0.18$, in which the $I_{3R(012)}$ is a peak intensity of an X-ray diffraction peak of a 3R-phase 012 crystal plane of the negative electrode active material in the negative electrode plate, and the $I_{2H(100)}$ is a peak intensity of an X-ray diffraction peak of a 2H-phase 100 crystal plane of the negative electrode active material in the negative electrode plate.

2. The secondary battery according to claim 1, wherein the negative electrode plate further satisfies: $0.02 \leq I_{3R(101)}/I_{2H(101)} \leq 0.18$, in which the $I_{3R(101)}$ is a peak intensity of an X-ray diffraction peak of a 3R-phase 101 crystal plane of the negative electrode active material in the negative electrode plate, and the $I_{2H(101)}$ is a peak intensity of an X-ray diffraction peak of a 2H-phase 101 crystal plane of the negative electrode active material in the negative electrode plate.

3. The secondary battery according to claim 1, wherein the natural graphite constitutes <50% by mass of the negative electrode active material.

4. The secondary battery according to claim 1, wherein the negative electrode active material has an average particle size $D_v50$ of from 11 μm to 15 μm.

5. The secondary battery according to claim 1, wherein the negative electrode active material has a tap density of ≥1.1 g/cm$^3$; and/or, the negative electrode active material has a graphitization degree of from 92% to 96%.

6. The secondary battery according to claim 1, wherein the negative electrode film has an areal density of from 10 $mg/cm^2$ to 13 $mg/cm^2$; and/or,
the negative electrode film has a compacted density of from 1.6 $g/cm^3$ to 1.8 $g/cm^3$.

7. The secondary battery according to claim 1, wherein the layered lithium transition metal oxides comprise one or more of lithium nickel cobalt manganese oxide, lithium nickel cobalt aluminium oxide and modified compounds thereof.

8. A secondary battery, comprising a positive electrode plate and a negative electrode plate, the positive electrode plate comprising a positive electrode current collector and a positive electrode film disposed on at least one surface of the positive electrode current collector and comprising a positive active material; the negative electrode plate comprising a negative electrode current collector and a negative electrode film disposed on at least one surface of the negative electrode current collector and comprising a negative electrode active material;
wherein the positive active material comprises one or more of lithium-containing phosphates with olivine structure and modified compounds thereof, and
the negative electrode active material comprises artificial graphite and natural graphite, and the negative electrode plate satisfies $0.04 \leq I_{3R(012)}/I_{2H(100)} \leq 0.22$
in which the $I_{3R(012)}$ is a peak intensity of an X-ray diffraction peak of a 3R-phase 012 crystal plane of the negative electrode active material in the negative electrode plate, and the $I_{2H(100)}$ is a peak intensity of an X-ray diffraction peak of a 2H-phase 100 crystal plane of the negative electrode active material in the negative electrode plate.

9. The secondary battery according to claim 8, wherein the negative electrode plate further satisfies: $0.04 \leq I_{3R(101)}/I_{2H(101)} \leq 0.22$;
in which the $I_{3R(101)}$ is a peak intensity of an X-ray diffraction peak of a 3R-phase 101 crystal plane of the negative electrode active material in the negative electrode plate, and the $I_{2H(101)}$ is a peak intensity of an X-ray diffraction peak of a 2H-phase 101 crystal plane of the negative electrode active material in the negative electrode plate.

10. The secondary battery according to claim 8, wherein the natural graphite constitutes >20% by mass of the negative electrode active material by mass.

11. The secondary battery according to claim 8, wherein the negative electrode active material has an average particle size $D_v50$ of from 15 μm to 19 μm.

12. The secondary battery according to claim 8, wherein the negative electrode active material has a tap density of <1.1 $g/cm^3$; and/or,
the negative electrode active material has a graphitization degree of from 92% to 95%.

13. The secondary battery according to claim 8, wherein the negative electrode film has an areal density of from 7 $mg/cm^2$ to 10 $mg/cm^2$; and/or,
the negative electrode film has a compacted density of from 1.5 $g/cm^3$ to 1.7 $g/cm^3$.

14. The secondary battery according to claim 8, wherein the lithium-containing phosphates with olivine structure comprises one or more of lithium iron phosphate, composite materials of the lithium iron phosphate and a carbon, and modified compounds thereof.

15. The secondary battery according to claim 1, wherein the negative electrode plate satisfies $0.04 \leq I_{3R(012)}/I_{2H(100)} \leq 0.12$
in which the $I_{3R(012)}$ is a peak intensity of an X-ray diffraction peak of a 3R-phase 012 crystal plane of the negative electrode active material in the negative electrode plate, and the $I_{2H(100)}$ is a peak intensity of an X-ray diffraction peak of a 2H-phase 100 crystal plane of the negative electrode active material in the negative electrode plate.

16. The secondary battery according to claim 1, wherein the negative electrode plate further satisfies: $0.04 \leq I_{3R(101)}/I_{2H(101)} \leq 0.12$,
in which the $I_{3R(101)}$ is a peak intensity of an X-ray diffraction peak of a 3R-phase 101 crystal plane of the negative electrode active material in the negative electrode plate, and the $I_{2H(101)}$ is a peak intensity of an X-ray diffraction peak of a 2H-phase 101 crystal plane of the negative electrode active material in the negative electrode plate.

17. The secondary battery according to claim 1, wherein the natural graphite constitutes from 15% to 25% by mass of the negative electrode active material.

18. The secondary battery according to claim 1, wherein the negative electrode active material has an average particle size $D_v50$ of from 12 μm to 14 μm.

19. The secondary battery according to claim 8, wherein the negative electrode plate further satisfies $0.06 \leq I_{3R(012)}/I_{2H(100)} \leq 0.18$;
in which the $I_{3R(012)}$ is a peak intensity of an X-ray diffraction peak of a 3R-phase 012 crystal plane of the negative electrode active material in the negative electrode plate, and the $I_{2H(100)}$ is a peak intensity of an X-ray diffraction peak of a 2H-phase 100 crystal plane of the negative electrode active material in the negative electrode plate.

20. The secondary battery according to claim 8, wherein the negative electrode plate further satisfies: $0.06 \leq I_{3R(101)}/I_{2H(101)} \leq 0.18$;
in which the $I_{3R(101)}$ is a peak intensity of an X-ray diffraction peak of a 3R-phase 101 crystal plane of the negative electrode active material in the negative electrode plate, and the $I_{2H(101)}$ is a peak intensity of an X-ray diffraction peak of a 2H-phase 101 crystal plane of the negative electrode active material in the negative electrode plate.

* * * * *